United States Patent [19]

Price et al.

[11] Patent Number: 5,074,734

[45] Date of Patent: Dec. 24, 1991

[54] BALE UNROLLER

[76] Inventors: Gary F. Price, Rte. 1, Box 198-5, Blooming Grove, Tex. 76626; James Chapman, 114 W. 9th St., Lancaster, Tex. 75146

[21] Appl. No.: 608,810

[22] Filed: Nov. 5, 1990

[51] Int. Cl.[5] ....................... B65H 75/40; A01D 90/10

[52] U.S. Cl. .................................... 414/24.6; 414/911; 242/86.5 R; 294/107; 294/120

[58] Field of Search ..................... 414/24.5, 24.6, 911, 414/555, 558; 293/117; 242/86.5 R, 73.5; 211/59.1, 59.2, 195, 16, 58; 294/107-109, 120

[56] References Cited

U.S. PATENT DOCUMENTS

| | | | |
|---|---|---|---|
| 3,908,846 | 9/1975 | Brummitt | 414/24.6 X |
| 3,946,887 | 3/1976 | Parker | 414/24.6 X |
| 4,008,862 | 2/1977 | Wilmes | 414/24.6 X |
| 4,049,140 | 9/1977 | Roose | 414/24.6 |
| 4,095,706 | 6/1978 | Schwien et al. | 414/24.6 |
| 4,113,116 | 9/1978 | Brandt | 414/24.6 |
| 4,298,301 | 11/1981 | Carter et al. | 414/24.6 |
| 4,579,497 | 4/1986 | Nine | 414/24.6 X |
| 4,674,933 | 6/1987 | Brown | 414/24.5 X |
| 4,687,402 | 8/1987 | Zatylny | 414/24.5 X |
| 4,722,651 | 2/1988 | Antal | 414/24.5 |

FOREIGN PATENT DOCUMENTS

| | | | |
|---|---|---|---|
| 1157433 | 11/1983 | Canada | 414/24.6 |
| 2136392 | 9/1984 | United Kingdom | 414/24.6 |

*Primary Examiner*—Frank E. Werner
*Assistant Examiner*—Brian K. Dinicola
*Attorney, Agent, or Firm*—Richard C. Litman

[57] ABSTRACT

An unrolling device for cylindrical hay bales spikes the bale on its axis and pulls it along the ground to unroll it, when the device is pulled by a pickup truck, tractor, or the like. It comprises a transverse crossbar, two arms hinged at their ends to respective ends of the crossbar, and spikes insertable through the arm ends. The arms may swing out from the bar to a right angle; when both are swung out they lie parallel to one another. The spikes fit through the arm ends to protrude inwardly in the same plane as the plane formed by the crossbar and arms. Thus when set up for use the device has the general shape of a serif capital letter C. In use, the arms are set out on either side of a bale and the spikes are inserted through the arm ends to penetrate the hay bale on its axes. The device is pulled by chains on the crossbar to unroll the bale. When not in use, the device folds into a compact linear shape; the spikes are removed and the arms are folded down. The spikes are stored, lying alongside the arms, in special holders so as to be out of the way.

10 Claims, 2 Drawing Sheets

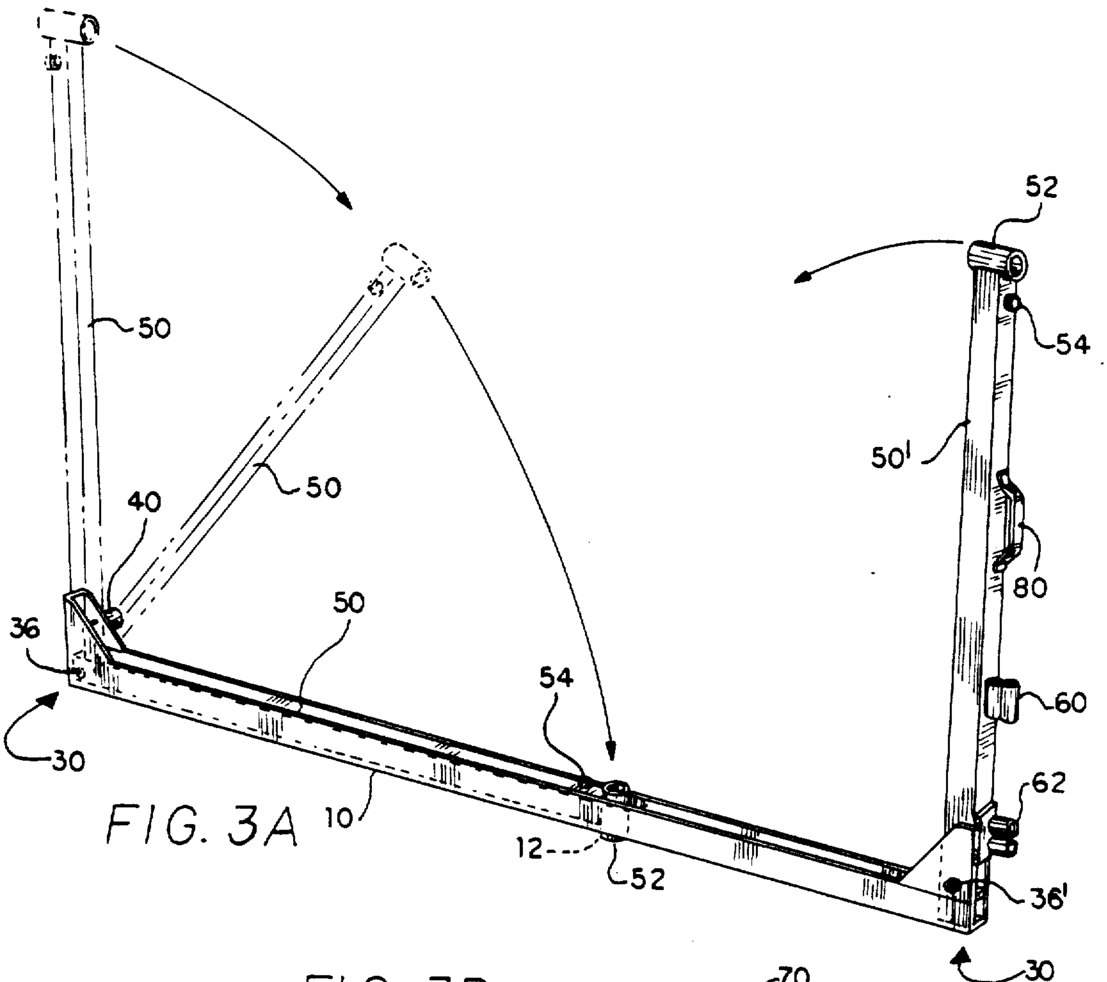
FIG. 3A
FIG. 3B
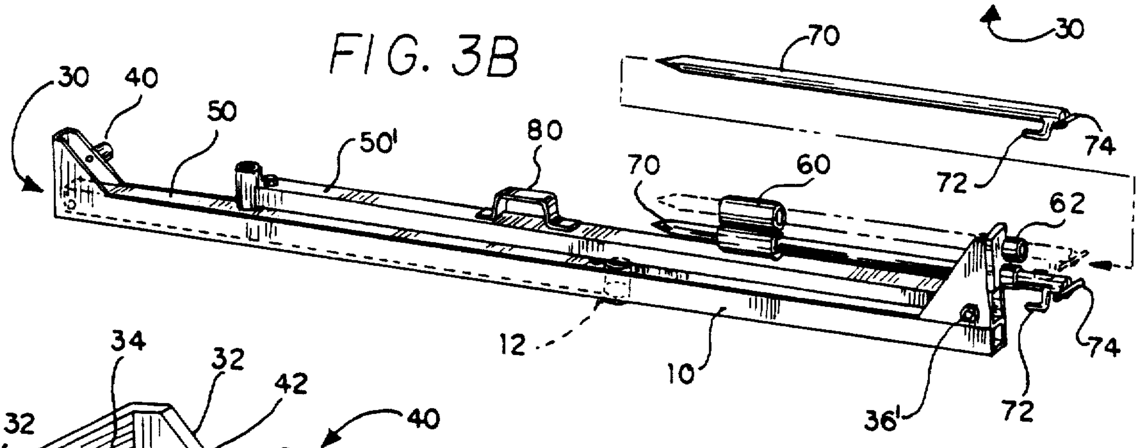
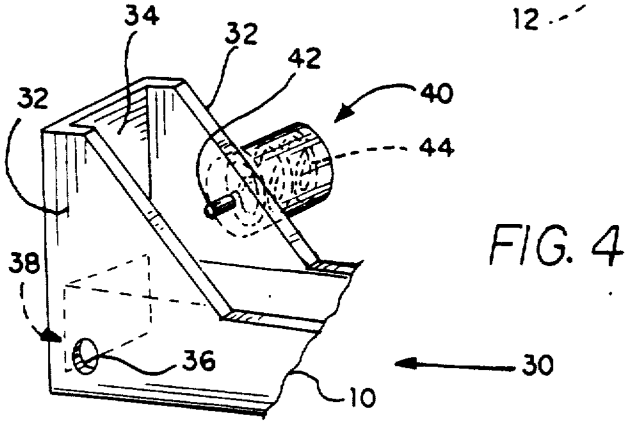
FIG. 4

BALE UNROLLER

FIELD OF THE INVENTION

The present invention relates to devices for unrolling bales of hay when the bales have cylindrical wrapped layer structure.

DESCRIPTION OF THE PRIOR ART

Hay is often rolled in bales which are cylindrical in shape, and are made up of a long planar layer which can be unrolled in the manner of a carpet. Unrolling the bale has the advantage that animals may feed from the unrolled bale in greater numbers and more easily than from the rolled bale.

The prior art shows several devices for unrolling such a cylindrical bale. These devices all include a hitch for sttaching the unrolling device to a tractor or truck, a transverse crossbar, two arms extending rearwardly from the ends of the crossbar, and bale impaling spikes at the rear ends of the arms for impaling the bale on its axis at either end of the cylinder.

Brandt, in U.S. Pat. No. 4,113,116, shows a bale unrolling apparatus in which the arms are rigidly locked to the crossbar, and the crossbar is broken in the middle. Thus the two L-shaped rigid sides are joined at the break in the middle of the bar. The tractor pulls on the joint. The joint is so designed that the bale-impaling arm ends are forced into the bale axis when the apparatus is dragged forward.

Carter et al. show a bale handler designed to be bolted onto the bed of a pickup truck. The arms slide upon the crossbar to allow the impaling arm ends to separate and then close on a bale. Both the crossbar and arm ends are of square section, so that rotation of the arms about the axis of the crossbar is impossible. The crossbar is held to a plate bolted onto the truck bed by an arrangement of lever arms. The arms are hydraulically powered. Thus the bale can be lifted off the ground by the lever arms.

Antal, in U.S. Pat. No. 4,722,651, shows another apparatus for mounting on a pickup truck. Antal's device, unlike that of Carter et al., is mounted on the truck's bumper. The crossbar is attached to the truck, and the arms are hinged to the crossbar. The arms are moved for impaling the bale by individual hydraulic cylinders between the crossbar and either arm; the arms do not exert force on each other, but on the crossbar. A third hydraulic arm rotates the crossbar. The hinges are free in only one direction, so rotating the crossbar lifts the arm ends, and an impaled bale.

Brummitt, in U.S. Pat. No. 3,908,846, shows a bale handling apparatus for mounting on a tractor three-point hitch. Double crossbars with welded connecting members make up a rigid rear frame. The bars are separated sufficiently that the one upper and two lower attachment points of the three-point hitch attach directly to the respective crossbars.

The arm on either side is triangulated, with two members running from a joining point at the impaler respectively to the top and bottom crossbar ends. The arms are hinged, top and bottom, to the ends of the crossbars for swinging the impaling arm ends away from and into the bale. The arms are moved by an hydraulic cylinder acting between the arms.

The impaler consists of forklike double spikes on a rotatable plate at either arm end. Both spikes are offset from the axis of rotation.

Roose, in U.S. Pat. No. 4,113,116, discloses a device similar to the Brummitt device, but lower in height and without triangulated. arms.

The devices above which use hydraulic power to lift a bale of hay are unnecessarily complicated if a farmer only wishes to unroll a bale. Also, either a tractor or a pickup truck specially fitted with hydraulic power is needed.

Wilmes, in U.S. Pat. No. 4,008,862, shows a device without powered movements. It consists of a chain attached to the crossbar for dragging, arms hinged to either end of the crossbar, and spikes extending from either arm for impaling the bale. The spikes extend from the arm end perpendicular to the hinge axes; thus the crossbar, arms and spikes always lie roughly within a plane. The arms fold inward for storage. To keep the arms from moving apart and losing the bale, locking pins are used. These pins are inserted through matching holes in the arm and a bracket of the crossbar.

Each bracket consists of an upper and a lower plate welded to the crossbar and extending rearwardly from it several inches. The respective arm is disposed in between the plates. A hinge rod extends through the upper plate, arm, and lower plate toward the rearward end of the plates, several inches from the forward arm end. The arm extends forward past the hinge rod just short of the length at which it would hit the crossbar. The locking pins pass through holes match drilled through the plates near the crossbar and the extreme forward end of the arm.

The arms must be able to swing outward past the point at which they are parallel so that the tips of the spikes can clear the sides of the bale. To impale the bale, the spikes must swing inward; the spikes are fairly long compared to the arms, so the angle of the spike will vary considerably between the start of insertion and full insertion of the spike. That is, the spike is turning (not rotating) while being inserted. This creates extra friction, tearing of the bale, bending force on the spikes, and misalignment.

Wilmes' round spikes are rotatably fixed into sleeves at the arm ends; this is intended to allow the spikes to rotate with the bale. Each spike is held by a shoulder and a collar on either side of the sleeve. Grease fittings allow grease to be injected into the space between the sleeve and the spike for lubrication. Given the amount of friction between a round steel spike and hay, this refinement may be an unneeded complication. The spikes are not removable.

The Wilmes device folds partially for transport. The arm hinges are built to be loose so that the spike end of an arm will not hit the crossbar upon folding the arm down. One spike is folded on the upper side of the crossbar, and the other is folded under the crossbar. Either the arms do not fold flat and parallel to the crossbar, or, the spike ends protrude past the bar upon folding.

The looseness of the hinges may make for lack of rigidity in the device when in use.

The Wilmes device has the advantages of requiring no hydraulic powder, and beingd simple in construction. However, it does not readily fold to a compact shape; if made to do so, pointed spikes protrude dangerously and awkwardly from the structure.

In addition, the bracket/arm arrangement of the device is structurally weak. The top and bottom plates are not supported against bending, but they are exposed to very large forces by leverage when only modest forces are exerted upon the arm ends.

Moreover, the device will be difficult to use due to the need for aligning the pin holes while holding the spikes within the bale. Such alignment can be a problem on farm equipment, where irregularities of the ground, minor distortions of the equipment, and the bulkiness and weight of the gear often conspire to prevent easy alignment of parts.

Since the pins cannot be inserted until the spike is in the bale, the Wilmes device presents some danger in handling. While being manipulated into position, the arms are of necessity unpinned. An arm can easily fall. Since the arm may weigh several pounds, and is tipped with a spike having a point sharp enough to easily penetrate a densely-wrapped hay bale, the lack of any locking device which will operate during assembly may be danger.

None of the above inventions and patents, taken either singly or in combination, is seen to describe the instant invention as claimed.

None of the above devices discloses a hay bale unroller which is simple to use, safe, lightweight and inexpensive in construction, which will stand up to hard use, and will fold compactly.

Accordingly, one object of the present invention is a hay bale unroller which is collapsible, yet light in weight, rigid and strong.

Still another object of the present invention is a hay bale unroller which folds compactly into a linear bundle without protruding parts.

A further object is an unroller which includes bale-impaling spikes which are inserted straight into a bale along the bale axis without turning during insertion.

An additional object is a bale unroller which requires no electric or hydraulic power attachments or special hitches, and which can be pulled by any convenient means to unroll a bale, such as, a pickup truck.

A final object is an unroller which includes arm position locks and which is safe and easy to attach to a hay bale.

These and other objects of the present invention will become readily apparent upon further review of the following specification and drawings.

SUMMARY OF THE INVENTION

The present invention is an unrolling device for unrolling cylindrical hay bales so that animals may feed on the hay more easily. The invention device grips the bale on its axis and pulls it along the ground to unroll it. It may be pulled by a pickup truck, tractor, horse, or any other means.

The invention comprises a transverse crossbar, two arms hinged at their ends to respective ends of the crossbar, and two spikes insertable through the arm ends. All parts are steel.

The arms may swing out from the bar to at most a right angle; the spikes fit into the arm ends to protrude inwardly in the same plane as that formed by the crossbar and arms. The device generally has the shape of serif capital letter C when set up for unrolling. The spikes penetrate the bale on its axis when inserted through the arm ends.

When the spikes are removed and the arms folded down, the device folds into a compact linear shape. The spikes are stored lying alongside the arms in special holders.

The ends of the crossbar each include a bracket to prevent the arms from swinging past a right angle. The bracket is formed of sheets of steel wrapped around a side, the end, and the opposite side of the bar, and welded. Snap pins are included to hold the arms out at right angles, to prevent the arms from falling during set-up of the unroller.

The arm's forward end is disposed within the bracket sides and hinged to the crossbar by a hinge pin passing through two sides of the bracket and the arm end. The side of the bracket at the end of the crossbar stops the arm from swinging out past a right angle. If the arms were free to swing, the pins could fall out.

BRIEF DESCRIPTION OF THE DRAWINGS

FIG. 3*a* shows how the arms fold. FIG. 3*b* shows the invention folded into a compact bundle.

FIG. 4 is a detail of one hinge joining the crossbar and an arm, showing a lock pin.

Similar reference numerals denote corresponding features consistently throughout the attached drawings. Primed numerals are used to denote one of the two arms; the arms are similar with only minor differences.

DETAILED DESCRIPTION OF THE PREFERRED EMBODIMENT

Figure 1:
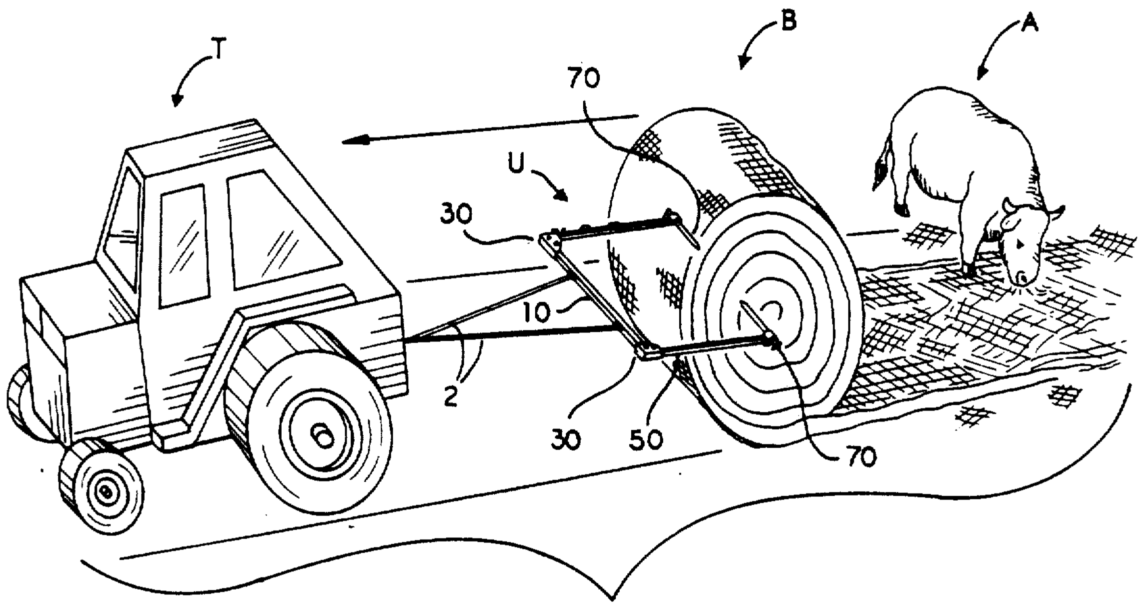
FIG. 1 is an environmental perspective view from above. A tractor is shown pulling the invention by means of a chain, and a bale of hay is being pulled by the invention. The bale is unrolling for feeding an animal. The bale is drawn partially in phantom to reveal the invention.

In FIG. 1 the instant invention, a hay bale unroller U, is shown in use. A tractor T is unrolling a cylindrical hay bale B with the unroller U, for feeding by an animal A. The bale B is roughly cylindrical, made up of a rolled layer of hay which unrolls when the tractor T pulls the bale B across the ground. (If the unroller U were flipped over the bale B, and the tractor disposed on the other side, the bale could be rolled up again.)

Although a tractor is pictured, the unroller can be pulled by any means.

Figure 2:
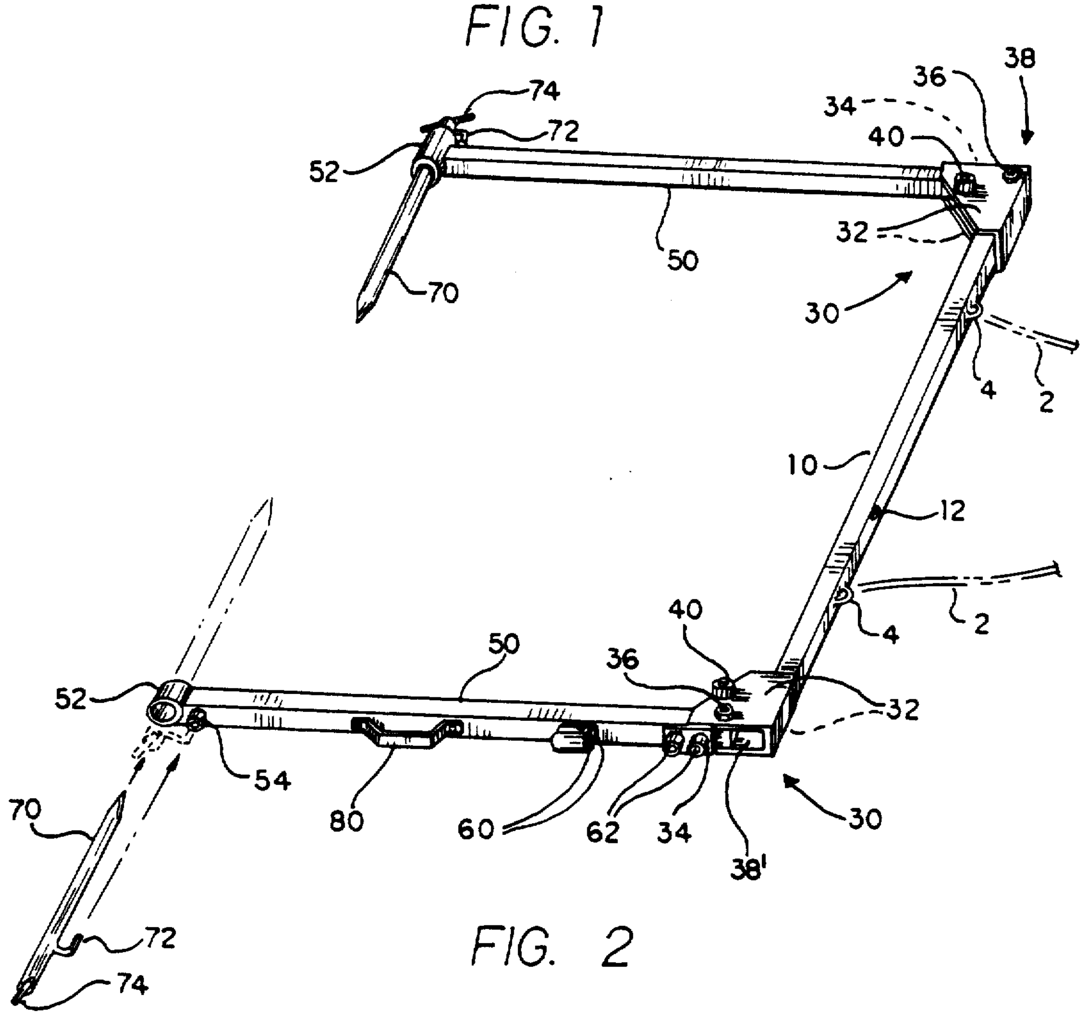
FIG. 2 is a perspective view of the invention showing the crossbar, hinges, arms, and spikes of the invention. One spike is shown exploded from the arm, and inserted in phantom view.

As is also shown in FIG. 2, the main parts of the unroller are: a crossbar 10, for attaching to the tractor by chains 2 and for locating the arms 50; arms 50 extending on either side of the bale B; hinges 30 connecting each arm to the crossbar; and spikes 70 penetrating the bale B on its axis. The force of the tractor passes through the chain 2, the cross bar 10, hinges 30, arms 50, and spikes 70, to the bale B.

The arms are preferably made of square-section steel tubing. The crossbar is a channel structure, as discussed below. Other parts are also of steel or other suitable material. The unroller parts may be fastened by welding.

The crossbar 10 must be long enough that the arms 50 will easily pass on either side of the bale B, but should be no longer. The arms 50 must be long enough to reach from the center of the bale B past the cylindrical outer bale surface; but it is preferable that the arms 50 not be too long, because the arms fold into the crossbar 10 for storage, as discussed below.

Referring to FIG. 2, the chains 2 are fastened to shackles 4 located at the front of the crossbar 10. (In this specification, "front" means toward the direction of unrolling, i.e., toward the tractor in FIG. 1 Conversely, "rear" means in the direction of the animal in FIG. 1.)

At either end of the crossbar 10 is a hinge 30. Each hinge 30 is further comprised of a bracket and pins. The bracket may be bent and then welded to the crossbar 10, welded together of several plates, formed from the same bent sheet that makes up the crossbar, or constructed in some other way. The bracket includes three planar sections: a top and bottom plates 32, and a side plate 34. (The three sections are also shown in FIG. 4.) This structure is very rigid and strong, as all three sections of the bracket are braced by at least one other section.

A hinge pin extends through hinge holes 36 in the top and bottom sections. This pin also passes through the front end of the arm 50, forming the hinge joint between the crossbar 10 and arm 50.

The various holes through which the hinge pin passes should be placed so that the arm 50 will be close to the side 34. If it is, and the side 34 is at right angles to the crossbar 10, then the arm 50 will be limited to at most a right angle relative to the crossbar 10.

This is important in the operation of the unroller, as the spikes 70 could pull out of the bale B if the arms 50 were able to swing past a right angle.

It is also convenient in the set-up of the invention. The arms 50 open just wide enough to admit the bale B within them. The arms will not fall off to the sides when setting up.

To prevent the arms falling inward, snap locks 40 are mounted on both left and right hinge brackets. These locks are commercially available. As shown in FIG. 4, the lock 40 consists of a pin 42 with a rounded end which protrudes a short distance through a hole in the top of the bracket top section 32. The pin 42 is urged to protrude by a spring 44 inside the body of the lock 40. When the arm 50 is rotated on its hinge toward the open position, the arm's upper edge will bear against the rounded end of the pin 42, push the pin up, and allow the arm to pass. The snap lock 40 is positioned so that when the arm 50 reaches its operating position (at right angle to the crossbar 10) the pin 42 is just clear of the trailing edge of the arm 50, and snaps down. To move the arm 50 back again now will require extra force to push the pin 42 up again. The arm 50 is thus held in the open position against falling during set-up.

(It will be appreciated that the snap lock 40 is an important safety feature. The steel arm 50 is capable of breaking fingers when falling from an upright position. The present invention, even without the locks 40, would be less dangerous than the Wilmes device discussed in the Description of the Prior Art above. This is because the spikes 70 of the present invention are not normally mounted on the arms 50 during set-up.)

It desired, the snap locks 40 may positioned to lock the arms 50 into their folded storage positions as well as their extended positions. Or, additional snap locks could be mounted on the brackets to hold the arms 50 in another position.

With both arms 50 extended and held, the unroller is to be aligned to the bale B so that the rear ends of the arms 50 lie on the axis of the bale. Each arm ends in an open round sleeve 52 transverse to the length of the arm 50. With the arm ends on the bale axis, the spikes 70 are inserted through the sleeves 52 into the bale B. The spikes are pointed for ease of insertion. Once the spikes 70 are in place, the bale B will now turn on the spikes when the unroller U is pulled.

The spikes 70 are driven straight into the bale B. They do not pitch or yaw when being inserted. This reduces friction and tearing of the bale.

Each of the spikes 70 includes a bayonet pin 72 extending from the outside end where a handle 74 is located. The bayonet pin is bent in the middle to point parallel to the spike. The bayonet pin 72 mates with a stop 54 which internally accepts the end of the bayonet pin 72. (The stop 54 might be a section of pipe, or a nut, welded onto the arm 50. The stop does not hold the bayonet pin by friction, it only locates it rotationally.) The spike 70 is prevented from rotating by the bayonet pin's insertion into the stop 54. This prevents the spike from working out of the sleeve 52 during the unrolling operation.

When the unrolling is done, the spikes 70 are removed by simply pulling them out of the sleeves 52 by the spikes handles 74. The unroller U may then be folded to a compact bundle as will now be explained.

Referring to FIG. 3*a*, the arms 50 are shown in a partially folded position. The following discussion will distinguish between arms 50 and 50'.

Arm 50 is shown twice in phantom, and also is shown in its final folded position within the crossbar 10. The crossbar 10, as mentioned above, is a channel section member. The open side of the channel faces to the rear, and accepts the arm 50 upon folding.

A relief gap 38 on the side section 34 of the bracket allows the arm 50 to swing inward without interfering with the side section 34.

A hole 12 in the front of the crossbar 10 is positioned to accept the extended part of the sleeve 52 of the arm 50 when the arm 50 is folded into the crossbar 10. If the hole 12 were not there, the arm 50 would not lie flat.

It will be noted that the hinge hole 36 for the arm 50 is positioned close to the front of the crossbar 10. It will also be noted that the hinge hole 36' of the arm 50' is positioned farther away from the crossbar front. This is because the arm 50' when, folded down on top of the arm 50, should lie flat on top of the arm 50 and parallel to the crossbar 10. Thus the folded unroller is made very compact, as shown in FIG. 3*b*.

As a corollary of the above, arm 50 may be made slightly shorter than arm 50'. However, the distance from the front edge of the crossbar to either sleeve 52 should be constant.

The spikes 70, which were removed from the bale B in the first step of storing the unroller U, may be inserted through a first pair of storage tubes 62 on the side section 34 of the bracket, into a second pair of storage tubes 60 mounted on the folded arm 50'. In FIG. 3*b*, one spike is shown inserted into the storage tubes and another spike is shown exploded out.

Now the folded unroller U, along with the spikes 70, may be conveniently carried by means of the handle 80. The chain 2 may be wrapped about the end of the crossbar 10 opposite the spikes 70 to hold the unroller together and counterbalance the spikes. The entire unroller is thus easily carried and stored.

It is to be understood that the present invention is not limited to the sole embodiment described above, but encompasses any and all embodiments within the scope of the following claims.

We claim:

1. An apparatus for unrolling large hay bales comprising:

a crossbar having two crossbar ends; means on said cross bar for connecting same to an implement hitch of a prime mover;

two arms, each one of said arms including a forward end and a rear end;

a pair of hinges, each one of said hinges connecting the forward end of one of said arms to a respective said crossbar end, said hinges adapted to permit said arms to rotate relative to said crossbar in a single plane, said hinges each including a respective angular range limiting stop member permanently affixed thereto, said stop member adapted to permit said arms to rotate relative to said crossbar to define acute angles between said arms and said crossbar, and to prevent said arms from rotating relative to said crossbar to define obtuse angles between said arms and said crossbar;

spikes removably attached to said rear ends of said arms, said spikes when attached thereto extending at right angles to said arms, lying in said single plane defined by said rotation of said arms, and generally colinear when both said arms are rotated to an extended angle away from said crossbar, said extended angle generally a right angle;

whereby when said arms are extended to said extended angle said spikes may be attached to said rear ends of said arms to penetrate a hay bale for unrolling; and locking means for holding said arms at said extended angle, said locking means comprising a biased abutment on each of said hinges and adapted to yield when said arms are moved from said extended angle by a hand force;

whereby each biased abutment is positioned to engage a corresponding arm when said corresponding arm is at said extended angle and to yield when engaged by a first edge of said corresponding arm as said corresponding arm is rotated by hand with a minimum threshold force.

2. The apparatus for unrolling large hay bales as in claim 1 including:

sleeves at said rear ends of said arms for removably attaching said spikes to said arms, said sleeves adapted to slidingly accept said spikes therethrough; and spike holding means adapted to hold said spike against loosening within said sleeve.

3. The apparatus for unrolling large hay bales as in claim 2, wherein said spike holding means includes means to prevent said spikes from rotating within said sleeves.

4. The apparatus for unrolling large hay bales as in claim 1 wherein said crossbar, said hinges, and said arms are together adapted to permit folding of said arms to a folded position, wherein said arms and said crossbar are mutually parallel.

5. The apparatus for unrolling large hay bales as in claim 4 wherein said locking means are adapted to hold said arms at said folded position against a force exerted by the weight of said arms.

6. The apparatus for unrolling large hay bales as in claim 5 wherein said locking means are adapted to yield when said arms are moved from said folded position by a hand force whereby each of said biassed abutments is positioned to engage a corresponding arm when said arm is at said folded angle and to yield when engaged by a second edge of said corresponding arm as said arm is rotated by hand with a minimum threshold force.

7. The apparatus for unrolling large hay bales as in claim 1 including spike storage means.

8. The apparatus for unrolling large hay bales as in claim 7 wherein said storage means is adapted to store said spikes parallel to one of said arms.

9. The apparatus for unrolling large hay bales as in claim 7 wherein said storage means includes tubes wherein said spikes may be inserted for storage.

10. An apparatus for unrolling large hay bales comprising:

a crossbar having two crossbar ends;

means on said cross bar for connecting same to an implement hitch of a prime mover;

two arms, each one of said arms including a forward end and a rear end;

a pair of hinges, each one of said hinges connecting the forward end of one of said arms to a respective said crossbar end, said hinges adapted to permit said arms to rotate relative to said crossbar in a single plane, said hinges adapted to permit said arms to rotate relative to said crossbar to define acute angles between said arms and said crossbar, said hinges adapted to prevent said arms from rotating relative to said crossbar to define obtuse angles between said arms and said crossbar;

spikes removably attached to said rear ends of said arms, said spikes when attached thereto extending at right angles to said arms, lying in said single plane defined by said rotation of said arms, and generally colinear when both said arms are rotated to an extended angle away from said crossbar, said extended angle generally a right angle;

locking means for holding said arms at said extended angle, said locking means comprising a biased abutment on each of said hinges and adapted to yield when said arms are moved from said extended angle by a hand force;

whereby each biased abutment is positioned to engage a corresponding arm when said corresponding arm is at said extended angle and to yield when engaged by a first edge of said corresponding are as said corresponding arm is rotated by hand with a minimum threshold force;

sleeves at said rear ends of said arms for removably attaching said spikes to said arms, said sleeves adapted to slidingly accept said spikes therethrough; and spike holding means adapted to hold said spike against loosening within said sleeve and to prevent said spikes from rotating within said sleeves, said spike holding means including a pin mounted on said spike, said pin having a pin end and including a straight portion parallel to and noncoaxial with said spike and an aperture mounted on said arm, said aperture adapted to internally accept said pin end; whereby when said arms are extended to said extended angle said spikes may be attached to said rear ends of said arms to penetrate a hay bale for unrolling, and said spike may not rotate relative to said arm.

* * * * *